W. F. DALY.
TABLE-LEAF SUPPORT.
No. 189,197. Patented April 3, 1877.
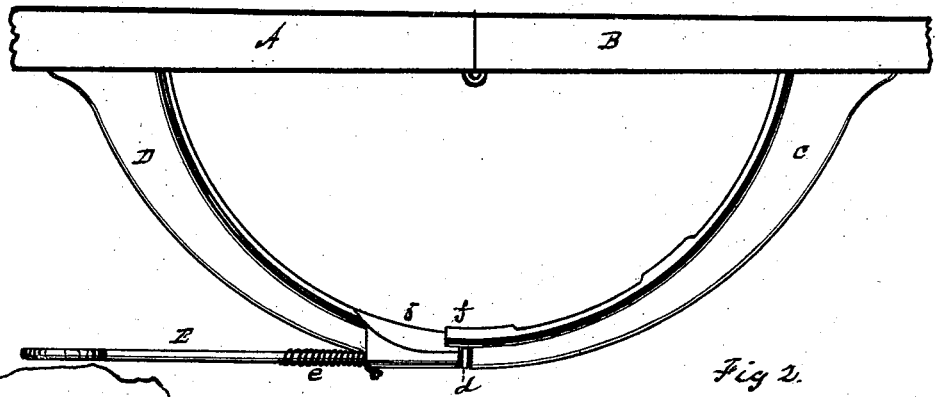
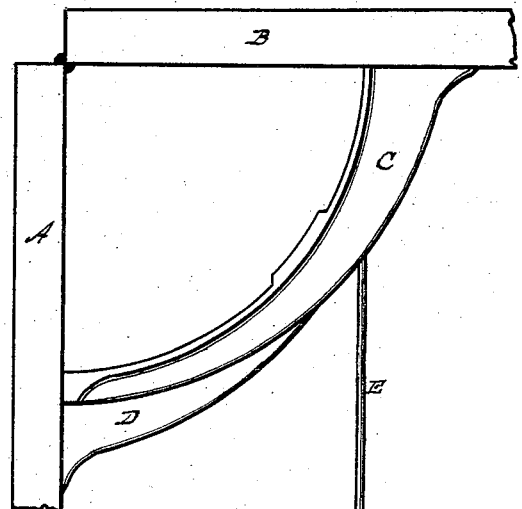
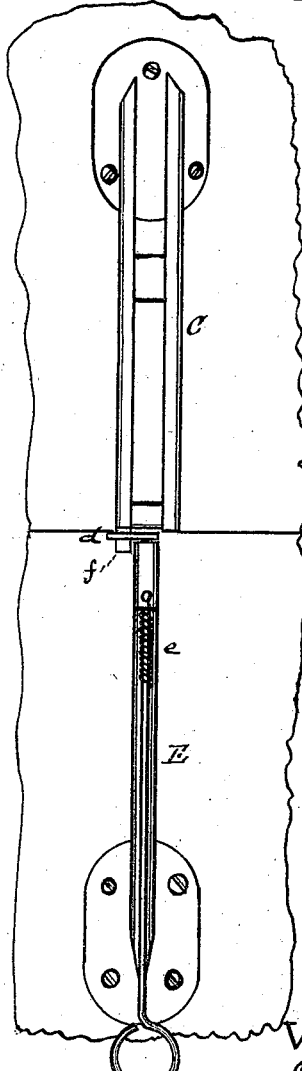
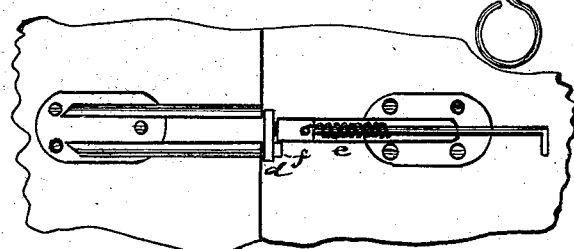
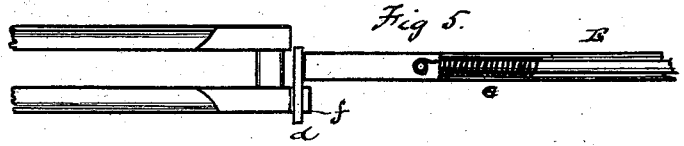

UNITED STATES PATENT OFFICE.

WILLIAM F. DALY, OF PERU, ASSIGNOR OF ONE-HALF HIS RIGHT TO EDWIN D. OLIN, OF INDIANAPOLIS, INDIANA.

IMPROVEMENT IN TABLE-LEAF SUPPORTS.

Specification forming part of Letters Patent No. 189,197, dated April 3, 1877; application filed March 19, 1877.

*To all whom it may concern:*

Be it known that I, WILLIAM F. DALY, of Peru, Indiana, have invented a new and useful Improvement in Table-Supports, of which the following is a full, clear, and exact description, reference being had to the accompanying drawings, making a part of this specification, in which—

Figure 1 represents a side elevation, with the leaf of the table raised. Fig. 2 shows the same view, with the leaf down. Fig. 3 is a plan view from the under side. Fig. 4 is a modification of the same. Fig. 5 is an enlarged view of a portion of Fig. 3.

My invention relates to supports for folding-leaves of tables, desks, and similar articles, and is an improvement on Patent No. 142,210, issued to me August 26, 1873. It consists in the combination of devices, hereinafter explained and claimed.

To enable others skilled in the art to make and use my invention, I will proceed to describe the exact manner in which I have carried it out.

In the drawings, A B represent the leaves of a table, united by ordinary butt-hinges. Under the portion B is firmly secured the grooved curved arm C, and to the leaf A is secured the curved arm D, the two arms, when in position, as shown in Fig. 1, forming the arc of a circle. When the leaf A is lowered, as shown in Fig. 2, the arm D is formed to slide within the groove on the arm C until the leaf A assumes a position at right angles to the leaf B. On the outer end of the arm D I make an enlargement, $b$, provided with a longitudinal hole, through which passes the rod E, around which is placed the coiled spring $e$, to give the rod E a revolving motion. On the end of the rod, adjoining the outer end of the arm D, is secured the stop-plate $d$, in width less than the width of the groove in the arm C, but in length slightly greater than the width of the groove. On the outer end of the arm C is a lug, $f$, to catch and hold the plate $d$ longitudinally across the mouth of the groove in the arm C.

The operation of my support is as follows: Supposing the leaves A B to be in the position shown in Fig. 1. By a turn of the rod E to the right against the coil-spring $e$ one-quarter of a circle the plate $d$ is raised to a vertical position, and in that position will readily pass into and follow the groove in the arm C as the leaf B descends. When it is required to extend the leaf B it is again raised until the arms C and D clear each other enough for the stop-plate $d$ to be thrown, by the spring $e$, again across the mouth of the groove, when the leaf B is again firmly braced in a horizontal position, as shown in Fig. 1.

Fig. 4 shows a slight modification of the form of the support, to adapt it to small tables and desks.

Having thus described my invention, what I claim as new, and desire to secure by Letters Patent, is—

The grooved arm C, provided with the lug $f$, and the arm D, provided with the hollow enlargement $b$, in combination with the rod E, spring $e$, and plate $d$, all constructed and arranged substantially as set forth.

WILLIAM F. DALY.

Witnesses:
WILLIAM E. MOWBRAY,
U. P. FOBES.